No. 694,773. Patented Mar. 4, 1902.
W. L. MORRIS.
BLOW-OFF VALVE.
(Application filed Aug. 23, 1897. Renewed Oct. 27, 1899.)
(No Model.)
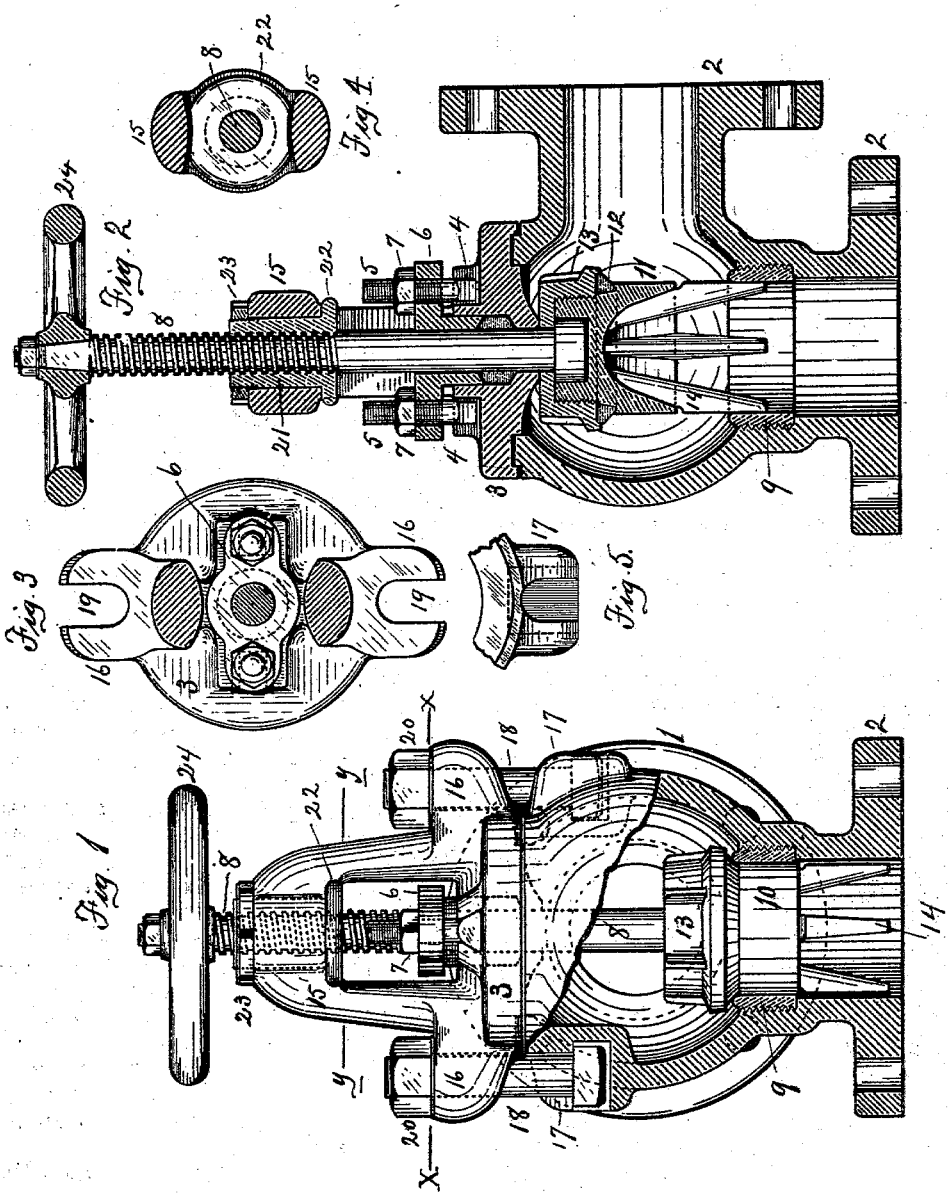
Witnesses:
H. P. Bailey
Henry Pierson
Inventor.
Wm L Morris
By H. S. Sprague
Att'y.

UNITED STATES PATENT OFFICE.

WILLIAM L. MORRIS, OF CLEVELAND, OHIO.

BLOW-OFF VALVE.

SPECIFICATION forming part of Letters Patent No. 694,773, dated March 4, 1902.

Application filed August 23, 1897. Renewed October 27, 1899. Serial No. 734,983. (No model.)

*To all whom it may concern:*

Be it known that I, WILLIAM L. MORRIS, a citizen of the United States, residing at Cleveland, in the county of Cuyahoga and State of Ohio, have invented certain new and useful Improvements in Blow-Off Valves, of which the following, with the accompanying drawings, is a specification.

This invention relates to certain new and useful improvements in valves of the class commonly termed "blow-off," "angle," and "globe" valves.

The object of the invention is to reduce the wear of the valve-seating faces and to provide economical and ready means for repair.

The invention consists in the novel features of construction and in the various combinations of the parts, all as more fully hereinafter described, and pointed out in the claims.

In the accompanying drawings, which form a part of this specification, Figure 1 is a side elevation of my improved valve with the shell partially broken away and showing the valve closed. Fig. 2 is a central vertical section at right angles to Fig. 1, but with valve open. Fig. 3 is a horizontal section on line $x\,x$ of Fig. 1. Fig. 4 is an inverse horizontal section on the line $y\,y$ of Fig. 1. Fig. 5 is a top plan of one of the recessed lugs formed on the valve case or body.

1 represents the valve body or case, provided with the flanged openings 2 at right angles to each other as means for connecting valve to pipe, or such openings may be threaded, if preferred.

3 represents the cap. In the upper face of this cap and upon opposite sides there are formed dovetail or undercut recesses 4, adapted to receive the heads of the bolts 5, the upper ends of which pass through the flange of the gland 6 and receive the nuts 7, said gland and cap forming a stuffing-box through which the valve-stem 8 passes.

9 is the valve-seat ring, and it is shown as screwed into a threaded bearing provided in the body 1. This valve-seat may be formed integrally with the valve-body or be tapered and driven into place.

10 represents the plug portion of the valve proper. It is provided with a piston portion 11, which slidingly engages the valve-seat ring 9. At the upper terminal of this piston portion there is formed an annular shoulder to receive the valve-ring 12, which may be flat upon the valve-seat or have an angular bearing on outer periphery of valve-ring or on the inner periphery of valve-ring, as shown. Ordinarily this valve-ring 12 would be made of some suitable soft metal, such as Babbitt. The upper end of the plug 10 is somewhat reduced and threaded to receive the cap-nut 13, which screws down upon and retains the valve-ring 12 in place, while it also retains the headed lower end of the valve-stem 8 in the recessed upper end of the plug 10, as shown. At the lower end of the piston portion there are formed the guide-wings 14, which do not pass out of the valve-ring 9 when valve is opened, thereby insuring the entrance of the piston as the valve is closed.

Rising from the piece 3 is the yoke 15, and it is provided with the diametrically opposite arms 16, arranged to come coincident with slotted recessed lugs 17, formed in the case or body 1.

18 are the bolts for securing the cap-piece 3 in place, the heads of the bolts engaging the slotted lugs 17, while their upper ends slip into slots 19, formed in the arms 16, and receive the nuts 20, by means of which the cap body are firmly secured together.

21 represents the stationary valve-stem nut through which the valve-stem 8 is threaded. This stem-nut 21 slips into an axial opening or hole in the head of the yoke 15 and is prevented from turning therein by the flanged head 22, while its upper ends receives a threaded collar 23, which retains the stem-nut in proper place.

24 is a hand-wheel secured upon the outer end of the valve-stem 8.

The parts being constructed and arranged substantially in the manner herein described, the operation is as follows—presuming the valve to be closed as shown in Fig. 1. As valve proper is raised from its seat, the piston portion is within the valve-seat ring and obstructs the flow, thereby decreasing wear of valve and seat. When piston portion has been sufficiently opened to allow free passage, the valve is protected from the current. When the valve is being closed, the piston portion is guided by the wings positively to the valve-ring seat, closes flow, and holds back any coarse matter, such as scale, and allows only a fine stream to play upon the valve, which when it seats itself is thoroughly washed of any particles which would deface the valve or seat were it to come between them when closed.

The accessibility to the various parts, and the manner the parts are assembled is so very apparent it is not deemed necessary to enlarge thereupon.

What I claim as my invention is—

1. The combination with a valve-seat, of a valve comprising a valve-plug provided with a male thread, a piston portion, and an angular circumferential recess intermediate of said thread and piston portion; a seating-ring of angular cross-section in said recess, and a cap-nut engaging said thread for securing said ring in said recess, substantially as set forth.

2. In a valve of the character described, a valve-plug carrying a valve-ring, a headed valve-stem engaging a recess in the head of said plug, and a cap-nut for securing and retaining said valve-ring and valve-stem in and upon said plug, in the manner and for the purpose, substantially as set forth.

3. In combination, a valve-case provided with a valve-seat ring 9, a plug carrying a valve-ring 12, a piston portion 11, guide-wings 14, a headed valve-stem 8, and a retaining cap-nut 13, substantially as and for the purpose specified.

4. In a device of the character described, in combination, a valve consisting of a body portion carrying a removable valve-ring, a headed valve-stem secured between the said body portion and a retaining-cap, said cap being adapted to secure said valve-ring in position, substantially as and for the purpose set forth.

In testimony whereof I affix my signature, in presence of two witnesses, this 5th day of June, 18

WM. L. MORRIS.

Witnesses:
H. S. SPRAGUE,
H. P. BAILEY.